United States Patent
Nishida

(10) Patent No.: US 9,081,528 B2
(45) Date of Patent: Jul. 14, 2015

(54) INFORMATION PROCESSING SYSTEM, METHOD OF PROCESSING INFORMATION, PROGRAM, AND RECORDING MEDIUM

(71) Applicant: Takayori Nishida, Tokyo (JP)

(72) Inventor: Takayori Nishida, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/331,345

(22) Filed: Jul. 15, 2014

(65) Prior Publication Data

US 2015/0022847 A1 Jan. 22, 2015

(30) Foreign Application Priority Data

Jul. 22, 2013 (JP) ................................. 2013-151539

(51) Int. Cl.
*G06K 15/00* (2006.01)
*G06F 3/12* (2006.01)

(52) U.S. Cl.
CPC ............ *G06F 3/1238* (2013.01); *G06F 3/1222* (2013.01); *G06F 3/1284* (2013.01)

(58) Field of Classification Search
None
See application file for complete search history.

(56) References Cited

U.S. PATENT DOCUMENTS

| | | | | |
|---|---|---|---|---|
| 8,223,376 | B2 * | 7/2012 | Shudo | 358/1.15 |
| 8,405,863 | B2 * | 3/2013 | Gouda | 358/1.15 |
| 8,629,999 | B2 | 1/2014 | Nishida | |
| 8,810,825 | B2 * | 8/2014 | Watanabe | 358/1.14 |
| 8,896,861 | B2 * | 11/2014 | Hamada | 358/1.15 |
| 2005/0182970 | A1 * | 8/2005 | Yasaki | 713/201 |
| 2008/0168542 | A1 * | 7/2008 | Sato | 726/5 |
| 2009/0187636 | A1 * | 7/2009 | Uchiyama et al. | 709/206 |
| 2012/0268770 | A1 * | 10/2012 | Fukuda | 358/1.14 |
| 2012/0300268 | A1 | 11/2012 | Oseto et al. | |
| 2013/0242335 | A1 * | 9/2013 | Naitoh | 358/1.14 |
| 2013/0329245 | A1 | 12/2013 | Nishida | |
| 2013/0335770 | A1 * | 12/2013 | Yasukawa | 358/1.14 |
| 2014/0022577 | A1 * | 1/2014 | Osada | 358/1.13 |
| 2014/0192128 | A1 * | 7/2014 | Arima | 347/179 |
| 2015/0058936 | A1 * | 2/2015 | Kang et al. | 726/4 |

FOREIGN PATENT DOCUMENTS

| | | |
|---|---|---|
| JP | 2001-051915 | 2/2001 |
| JP | 2004-236348 | 8/2004 |
| JP | 2012-248006 | 12/2012 |
| JP | 2014-016979 | 1/2014 |

* cited by examiner

*Primary Examiner* — Satwant Singh
(74) *Attorney, Agent, or Firm* — IPUSA, PLLC

(57) ABSTRACT

An information processing system including at least one computer including a receiving unit that receives a request to a predetermined destination, a generating unit that generates authority identifying information for identifying operation authority of an apparatus in response to the request, and a sending unit that sends the authority identifying information to a destination different from a transmission source of the request.

12 Claims, 12 Drawing Sheets

FIG.6

| USER NAME | PASSWORD | MAIL ADDRESS | ..... |
|---|---|---|---|
| A | ..... | aaa@xxxxx | ..... |
| B | ..... | bbb@xxxxx | ..... |
| .. | .. | .. | .. |

| JOB NAME | USER MODE | USER NAME | PIN CODE | PRINT DATA | ... |
|---|---|---|---|---|---|
| XXX | G | A | F12 | ... | ... |
| YYY | U | A | | ... | ... |
| .. | .. | .. | .. | .. | .. |

| MAIL ADDRESS | PIN CODE | AUTHENTICATED USER NAME |
|---|---|---|
| aaa@xxxxx | F93 | A |
| bbb@xxxxx | A98 | A |
| ccc@xxxxx | P23 | B |
| xxx@xxxxx | L30 | B |
| yyy@xxxxx | W52 | A |

| TRANSMISSION SOURCE ADDRESS | AUTHENTICATED ADDRESS | GUEST ADDRESS |
|---|---|---|
| RESPONSE DESTINATION | From,Cc | Cc |

112

INFORMATION PROCESSING SYSTEM, METHOD OF PROCESSING INFORMATION, PROGRAM, AND RECORDING MEDIUM

BACKGROUND OF THE INVENTION

1. Field of the Invention

The present invention generally relates to an information processing system, a method of processing information, a program, and a recording medium.

2. Description of the Related Art

An example of an image forming apparatus such as a printer or a multifunction peripheral, which is installed in an office or the like, is set up so that a usage is permitted only to the user, to whom operation authority is previously given.

Specifically, there is an image forming apparatus where an account corresponding to the operation authority is registered and use of the image forming apparatus is permitted to only a user authenticated based on the above account.

Patent Document 1: Japanese Laid-Open Patent Application No. 2004-236348

Patent Document 2: Japanese Laid-Open Patent Application No. 2001-051915

However, it is difficult for a guest user who does not previously has an account such as a visitor to an office or the like to use the above image forming apparatus. For example, an account for the guest may be prepared so that each guest user logs in using a common guest account. However, in this case, it is difficult to ensure security with respect to each guest user.

Therefore, it is preferable to enable a user without the operation authority to use the apparatus.

SUMMARY OF THE INVENTION

One aspect of the embodiments of the present invention may be to provide an information processing system including at least one computer including a receiving unit that receives a request to a predetermined destination, a generating unit that generates authority identifying information for identifying operation authority of an apparatus in response to the request, and a sending unit that sends the authority identifying information to a destination different from a transmission source of the request.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 6 illustrates an exemplary structure of a user information memory unit.

FIG. 7 illustrates an exemplary structure of a print information memory unit.

FIG. 8 illustrates an exemplary structure of a PIN code memory unit.

FIG. 10 illustrates an exemplary structure of a response destination setup memory unit.

DETAILED DESCRIPTION OF THE PREFERRED EMBODIMENTS

A description is given below, with reference to the FIG. 1 through FIG. 13 of embodiments of the present invention. Where the same reference symbols are attached to the same parts, repeated description of the parts is omitted.

Reference symbols typically designate as follows:
1: information processing system;
10: management server;
11: mail receiving unit;
12: mail classifying unit;
13: address confirming unit;
14: PIN code generating unit;
15: print information generating unit;
16: response mail generating unit;
17: mail returning unit;
18: print information sending unit;
20: image forming apparatus;
21: controller;
22: scanner;
23: printer;
24: modem;
25: operation panel;
26: network interface;
27: SD card slot;
30: user terminal;
31: Web browser;
32: mail sending unit;
40: mail server;
50: authentication server;
51: request responding unit;
52: user information memory unit;
60: storing server;
61: print information receiving unit;
62: print information memory unit;
63: print information providing unit;
80: SD card;
100: drive device;
101: recording medium;
102: auxiliary memory device;
103: memory device;
104: CPU;
105: interface device;

111: PIN code memory unit;
112: response destination setup memory unit;
211: CPU;
212: RAM;
213: ROM;
214: HDD;
215: NVRAM;
221: authentication controlling unit;
222: print information acquiring unit;
223: print controlling unit;
B: bus.

Figure 1:
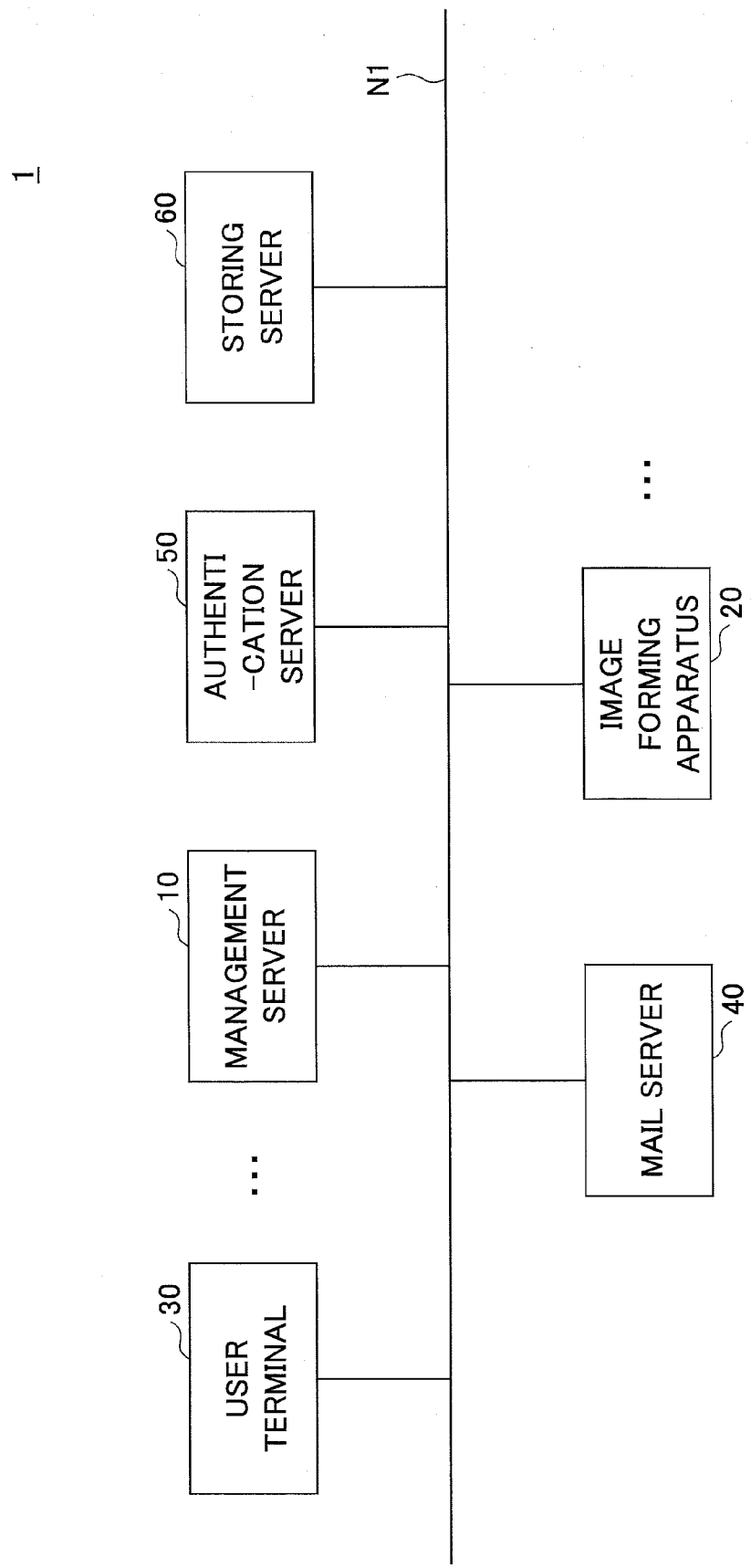
FIG. 1 illustrates an exemplary structure of an information processing system of an embodiment of the present invention.

FIG. 1 illustrates an exemplary structure of an information processing system of an embodiment of the present invention. In the information processing system 1 illustrated in FIG. 1, at least one user terminal 30, a mail server 40, a management server 10, an authentication server 50, a storing server 60, and at least one image forming apparatus 20 are connected through a network N1 such as a Local Area Network (LAN) or the Internet. A part or all of the network N1 may be a wireless communication network. A mobile communication network may intervene between the user terminal 30 and the network N1. The information processing system 1 is operated in a certain organization in a business enterprise or the like. Within the embodiment of the present invention, the organization is referred to as "a company A".

The user terminal 30 is an information processing apparatus directly operated by a user of the information processing system 1. For example, the user operates the user terminal 30 to cause the information processing system 1 to receive a print request. An example of the user terminals 30 is a personal computer (PC), a mobile phone, a smart phone, a tablet-type terminal, a personal digital assistance (PDA), or the like. Each of multiple user terminals 30 may be a model, which are mutually different.

In the embodiment, users of the information processing system 1 are distinguished between an "authenticated user" and a "guest user". Operation authority of operating an image forming apparatus 20 is previously given to an authenticated user. Said differently, the authenticated user is planned as a user of the information processing system 1. An exemplary authenticated user is an employee of the company A. The operation authority of the image forming apparatus 20 is not given to the guest user. An exemplary guest user is a visitor to the company A or a person other than an employee of the company A. In the information processing system 1, the distinction between the authenticated user and the guest user is performed whether an account corresponding to the operation authority of the image forming apparatus 20 is registered in the information processing system 1 (specifically, in a user information memory unit 52, described below). Further, the user terminal 30 may be an information processing apparatus, which is personally owned by the authenticated user or the guest user.

The mail server 40 is a computer, which transfers an email sent from the user terminal 30 or an email sent from the management server 10. For example, the user terminal 30 sends an email including a print request to the management server 10 in response to the instruction from the user. Electronic data to be printed is attached to the electronic data including the print request. The data format of the electronic data is not limited to a predetermined format. Hereinafter, an email, which is sent from the user terminal 30 and includes a print request, is referred to as a "print request mail". Further, the user terminal sends an email (hereinafter, referred to as a "PIN request mail") indicative of an issuance request for a Personal Identification Number (PIN) code to the management server 10 in response to an instruction from the user.

Within the embodiment, the PIN code is an example of temporarily or pseudo identification information corresponding to an operation authority of the image forming apparatus 20 instead of a user name and a password.

The authentication server 50 is a computer managing information (hereinafter, referred to as "user information") including the user names, the passwords, and the mail addresses of the authenticated users for each of the authenticated users. For example, the authentication server 50 performs an authentication process in response to an authentication request, where a user name or a password is designated. Further, the authentication server 50 performs processes corresponding to an existence confirming request of confirming the existence of the mail address and an acquisition request of a user name corresponding to the acquisition request of the user name.

The management server is a computer system including a computer issuing a PIN code or the like in response to a receipt of a PIN request mail or a computer system including at least one computer. Further, the management server 10 performs a generation of print data for electronic data (hereinafter, referred to as "attached data") attached to a print request mail in response to a receipt of the print request mail. The print data has a data format, which can be comprehended by the image forming apparatus 20. The management server 10 sends generated print data to a storing server 60 by associating the generated print data with the user name or the PIN code of a user who is a transmission source (a sender) of the print request mail. When the transmission source address of the print request mail is managed by the authentication server 60 by being associated with the user name, the user name is associated with print data. In a case where the transmission source address of the print request mail is not managed by the authentication server 50 in association with the user name, the management server 10 issues a PIN code. In a case where the PIN code is issued, the PIN code is associated with the PIN code instead of the user name.

The storing server 60 is a computer, which stores the print data sent from the management server 10.

The image forming apparatus 20 performs jobs related to scanning, copying, preprint, and sending and receiving facsimile. Even if any of the jobs cannot be performed by an apparatus, this apparatus may be used as the image forming apparatus 20. The image forming apparatus 20 performs a job requested by the user in a case where the authentication based on the user name and the password input by the user or the PIN code is successful. For example, the image forming apparatus 20 performs printing of the print data that are associated with the user name or the PIN code, which is input by the authenticated user, and stored in the storing server 60.

The management server 10, the authentication server 50, and the storing server 60 may be structured by one server or multiple servers. The number of the multiple servers may be appropriately determined according to an operation.

Figure 2:
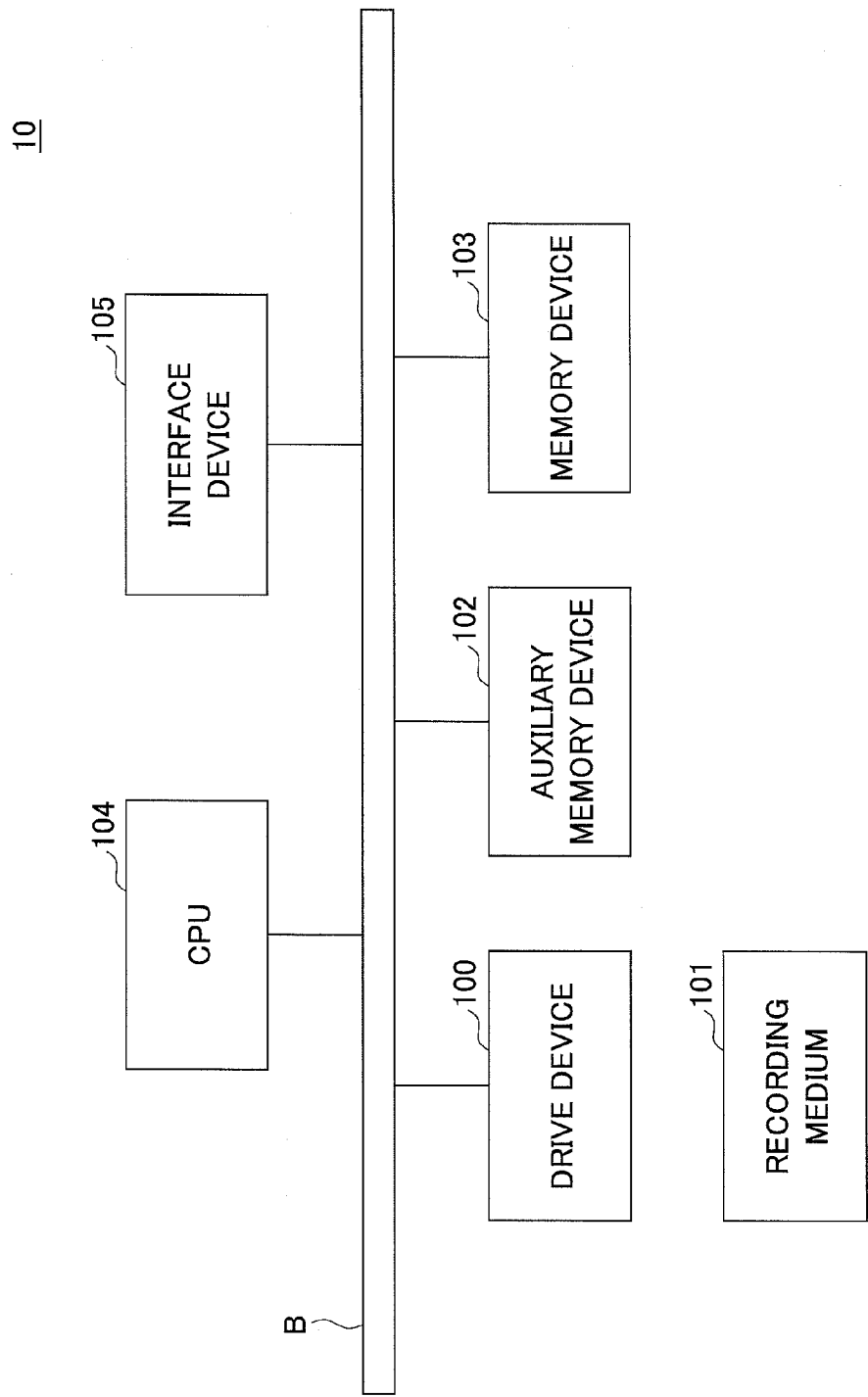
FIG. 2 illustrates an exemplary hardware configuration of a management server according to the embodiment of the present invention.

FIG. 2 illustrates an exemplary hardware configuration of the management server according to the embodiment of the present invention. The management server 10 illustrated in FIG. 2 includes a drive device 100, an auxiliary memory device 102, a memory device 103, a CPU 104 and an interface device 105, or the like, which are mutually connected.

A program realizing processes in the management server 10 is supplied by a recording medium 101 such as a CD-ROM. When the recording medium 101 with a program recorded on it is installed in the drive device 100, the program is installed into the auxiliary memory device 102 through the drive device 100 from the recording medium 101. However, the program needs not to be always installed from the recording medium 101 and may be downloaded from another computer via the network. The auxiliary memory device 102 stores necessary files, data and so on in addition to the installed program.

The memory device 103 reads out the program from the auxiliary memory device 102 when the program is instructed to be invoked and stores the program in the memory device 103. The CPU 104 performs a function related to the management server 10 in conformity with the program stored in the memory device 103. The interface device 105 is used as an interface for connecting to the network.

Figure 3:
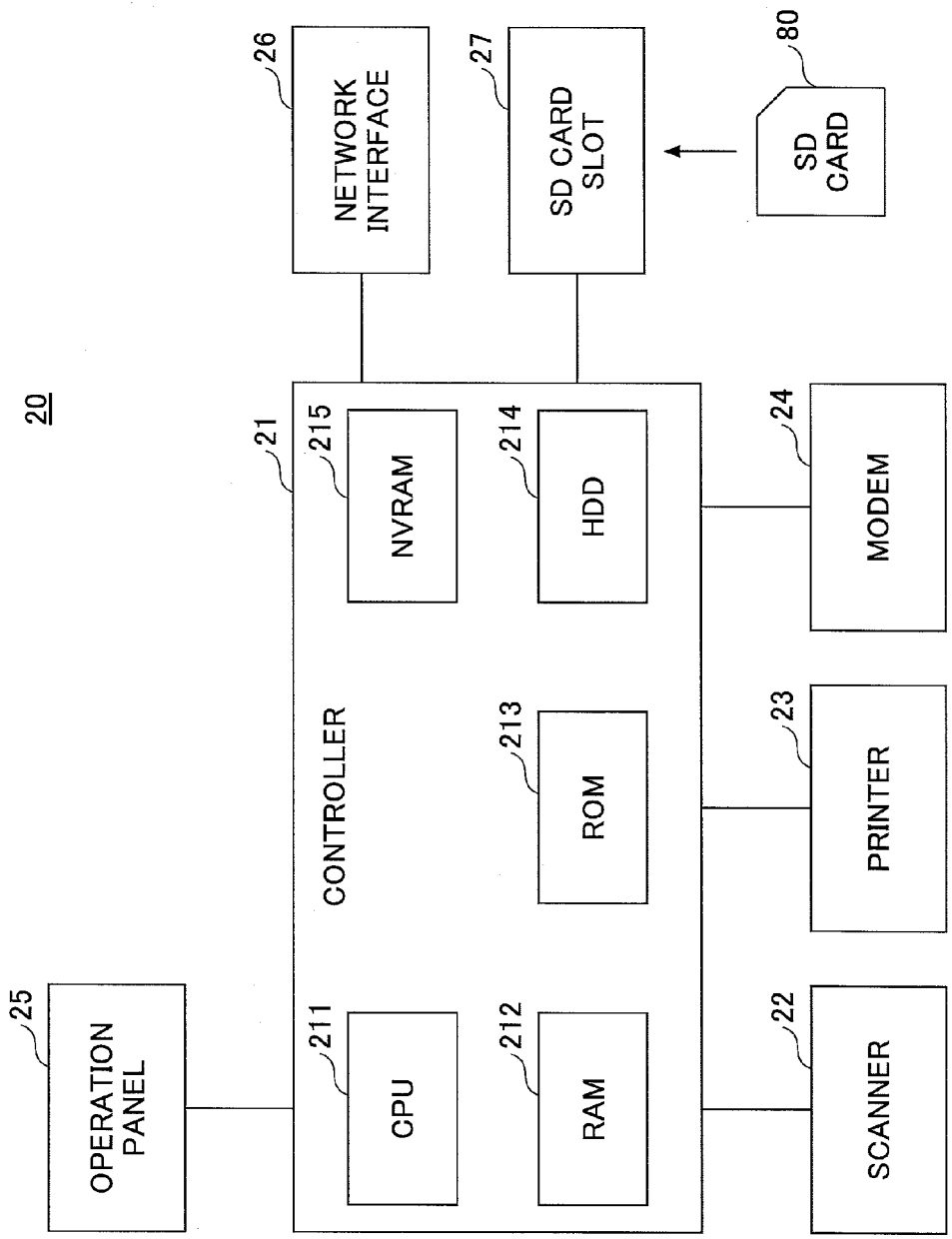
FIG. 3 illustrates an exemplary hardware configuration of the image forming apparatus of the Embodiment of the present invention.

FIG. 3 illustrates an example hardware configuration of the image forming apparatus of the embodiment of the present invention. Referring to FIG. 3, the image forming apparatus 20 includes hardware such as a controller 21, a scanner 22, a printer 23, a modem 24, an operation panel 25, a network interface 26, and an SD card slot 27.

The controller 21 includes a CPU 211, a RAM 212, a ROM 213, an HDD 214, an NVRAM 215, and so on. Various programs and data used by the programs are stored in the ROM 213. The RAM 212 is used as a memory area for loading the programs, a work area for the loaded programs, or the like. The CPU 211 performs various functions by processing the program loaded into the RAM 212. The HDD 214 records programs, various data used by the programs, or the like. The NVRAM 215 stores various setup information or the like.

The scanner 22 is hardware (an image reading unit) for reading image data from an original (an original manuscript). The printer 23 is hardware (a printing unit) for printing print data on a print paper. The modem 24 is hardware for connecting the image forming apparatus 20 to a telecommunication line (not illustrated) and is used for sending and receiving the image data with fax communications. The operation panel 25 is hardware provided with an input unit for receiving an input from the user such as a button, a display unit such as a liquid crystal panel, or the like. The liquid crystal panel may have a touch panel function. In this case, the liquid crystal panel may have the function of the input unit. The network interface 26 is hardware for connecting the image forming apparatus 20 to a wired or wireless network such as LAN. The SD card slot 27 is used to read a program recorded in an SD card 80. Said differently, not only the programs stored in the ROM 213 but also the programs stored in the SD card 80 may be loaded into the RAM 212 and executed by the image forming apparatus 20. The SD card 80 may be substituted by another recording medium such as a CD-ROM and a universal serial bus (USB) memory. The type of the recording medium substituting for the SD card 80 is not specifically limited. In this case, the SD card slot 27 may be substituted by hardware depending on the type of the recording media.

Figure 4:
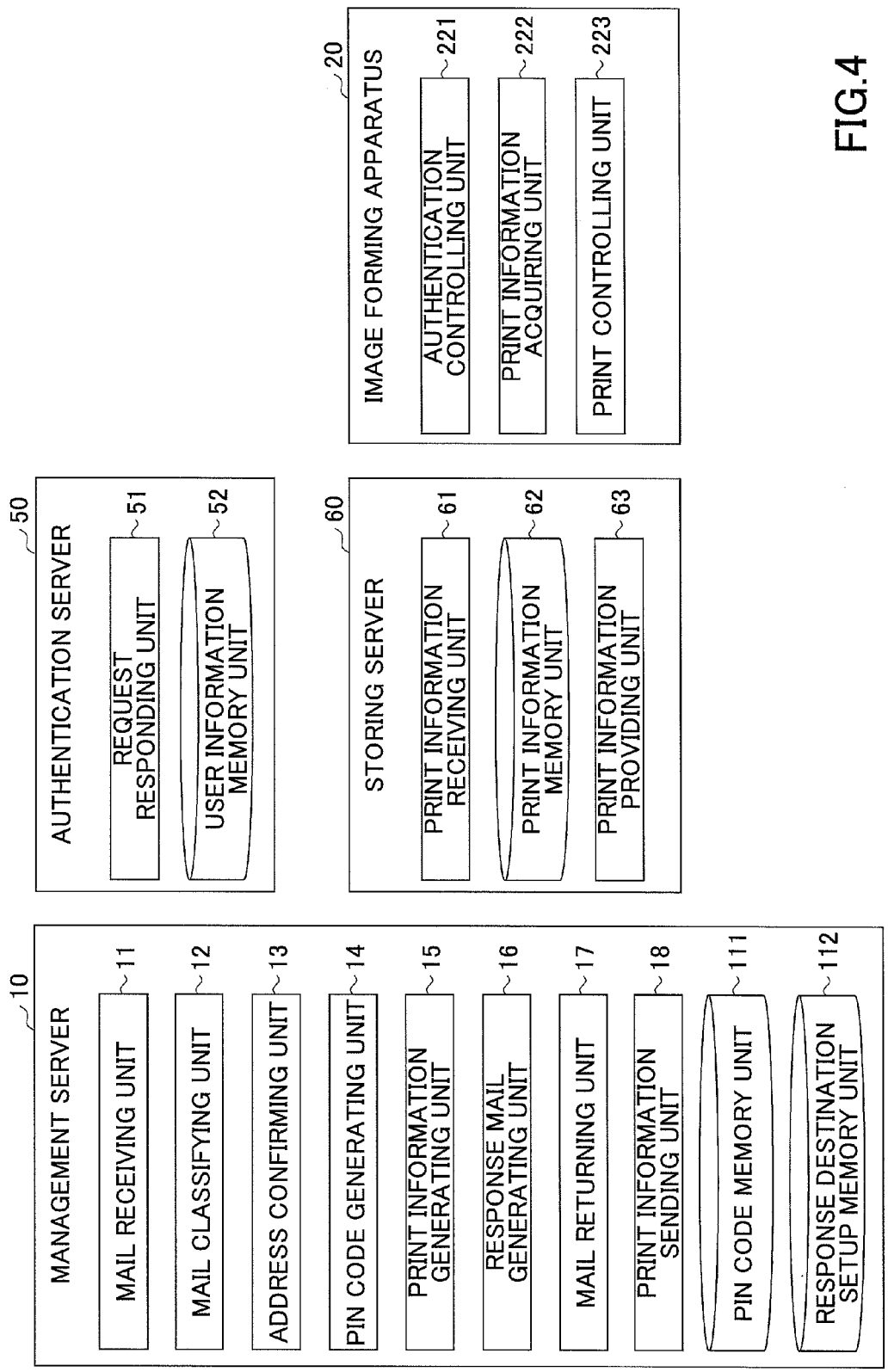
FIG. 4 illustrates an exemplary functional structure of the information processing system of the embodiment of the present invention.

FIG. 4 illustrates an exemplary functional structure of the information processing system of this embodiment. Referring to FIG. 4, the management server 10 includes a mail receiving unit 11, a mail classifying unit 12, an address confirming unit 13, a PIN code generating unit 14, a print information generating unit 15, a response mail generating unit 16, a mail returning unit 17, and a print information sending unit 18. These units are substantialized when one or more programs installed in the management server 10 are executed by the CPU 104.

The management server 10 uses a PIN code memory unit 111 and a response destination setup memory unit 112. These PIN code memory unit 111 and response destination setup memory unit 112 can be substantialized by the auxiliary memory device 102, a memory device or the like connected to the management server 200 through the network.

The mail receiving unit 11 receives a PIN request mail, a print request mail, or the like from the mail server 40. Destination addresses of the PIN request mail and the print request mail are previously determined. Therefore, the mail receiving unit 11 receives the email to the predetermined address as the PIN request mail or the print request mail. Within the embodiment, the destination addresses of the PIN request mail and the print request mail are the same.

It is necessary that the PIN request mail and the print request mail each sent by the guest user include a mail address (hereinafter, an "authenticated address") that relates to any one of authenticated users and is stored in the user information memory unit 52. For example, the authenticated address may be reported to the guest user by the authenticated user who has permitted the guest user to use the image forming apparatus 20. For example, the authenticated address may be designated as the Carbon copy (Cc) address or the Bcc address of the PIN request mail and the print request mail or may be included in the title (the reference) or the body of the PIN request mail and the print request mail.

Meanwhile, the mail address (hereinafter, a "guest address") of the guest user may be included in the PIN request mail and the print request mail, which are sent by the authenticated user in place of the guest user. As an example where the authenticated user sends the PIN request mail in place of the guest user, there is a case where the destination addresses of the PIN request mail and the print request mail of the PIN request mail and the print request mail need to be kept secret.

The mail classifying unit 12 determines a purpose or the like of an email received by the mail receiving unit 11. Specifically, the mail classifying unit 12 determines whether the email is the PIN request mail or the print request mail.

The address confirming unit 13 sends a request of checking an existence of the authenticated address, which is included in the transmission source addresses of the PIN request mail and the print request mail, the PIN request mail, and the print request mail, to the authentication server 50. As a result, it is possible to confirm whether the transmission source address or the authenticated address is registered in the authentication server 50. The address confirming unit 13 acquires the user name corresponding to the address from the authentication server 50 in a case where the address to be confirmed is registered in the authentication server 50.

The PIN code generating unit 14 generates a PIN code in a case where operation authority for operating the image forming apparatus 20 is permitted to be given to the sender of the PIN request mail. Further, the PIN code generating unit 14 generates a PIN code in a case where operation authority for operating the image forming apparatus 20 is permitted to be given to the sender of the print request mail where the transmission source address is not the authenticated address. The PIN code is not generated for the print request mail, the transmission source address of which is the authenticated address. This is because the sender of the print request mail is the authenticated user and always has the operation authority for the image forming apparatus 20.

The print information generating unit 15 generates print information in response to the print request mail. The print information includes information related to print data and a print job of the print data and the user name, the PIN code, or the like.

The response mail generating unit 16 generates the email (hereinafter, referred to as a "response mail") as a response to the PIN request mail or the print request mail. An issued PIN code is included in the response mail to the PIN request mail. Identification information of the print job based on the print data is included in the response mail to the print request mail.

In a case where the PIN code is generated in response to the print request mail, the response mail includes the PIN code.

The mail returning unit 17 returns the response mail as a response to the PIN request mail or the print request mail. The print information sending unit 18 stores the print information in the storing server 60 by sending the print information to the storing server 60. The PIN code memory unit 111 stores the PIN code generated by the PIN code generating unit 14 in association with the transmission source addresses of the PIN request mail or the print request mail. The response destination setup memory unit 112 stores the setup information related to the transmission destination of the response mail. Said differently, within the embodiment, the transmission destination of the response mail is not always limited to the transmission source addresses of the PIN request mail or the print request mail.

The authentication server 50 includes the request responding unit 51 and the user information memory unit 52 or the like. The user information memory unit 52 stores user information for each authenticated user. The request responding unit 51 performs a process corresponding to the authentication request, the existence confirming request of confirming the existence of the mail address, the acquisition request of acquiring the user name corresponding to the mail address, or the like. The request responding unit 51 is substantialized by a process of a program, which is installed in the authentication server 50, performed by the CPU of the authentication server 50. The user information memory unit 52 is substantialized by an auxiliary memory device of the authentication server, a memory device connected to the authentication server 50 through the network, or the like.

The storing server 60 includes a print information receiving unit 61, a print information memory unit 62, a print information providing unit 63, or the like. The print information receiving unit 61 stores the print information sent from the management server 10 and memorizes (stores) the received print information in the print information memory unit 62. The print information providing unit 63 returns the print information, which is memorized (stored) in the print information memory unit 62 and includes the user name or the PIN code each designated in the acquisition request, in response to the acquisition request of the print information from the image forming apparatus 20.

The print information receiving unit 61 and the print information providing unit 63 are substantialized by a process of at least one program installed on the storing server 60 and performed by the CPU of the storing server 60. The print information memory unit 62 is substantialized by an auxiliary memory device of the storing server 60, a memory device connected to the storing server 60 through the network, or the like.

The image forming apparatus 20 includes an authentication controlling unit 221, a print information acquiring unit 222, a print controlling unit 223, or the like. These units are substantialized when one or more programs installed in the image forming apparatus 20 are executed by the CPU 211. The authentication controlling unit 221 receives an input of the user name, the password, or the PIN code from the user. In a case where the user name and the password are input, the authentication controlling unit 221 requests the authentication server 50 to authenticate the user name and the password. In a case where the PIN code is input, the authentication controlling unit 221 confirms whether the PIN code is stored in the PIN code memory unit 111. The print information acquiring unit 222 sends an acquisition request of requesting to acquire the print information to the storing server 60. At least one of the user name and the PIN code, which are received by the authentication controlling unit 221, is designated in the acquisition request. The print controlling unit 223 performs a print process to print data acquired by the print information acquiring unit 222.

Figure 5:
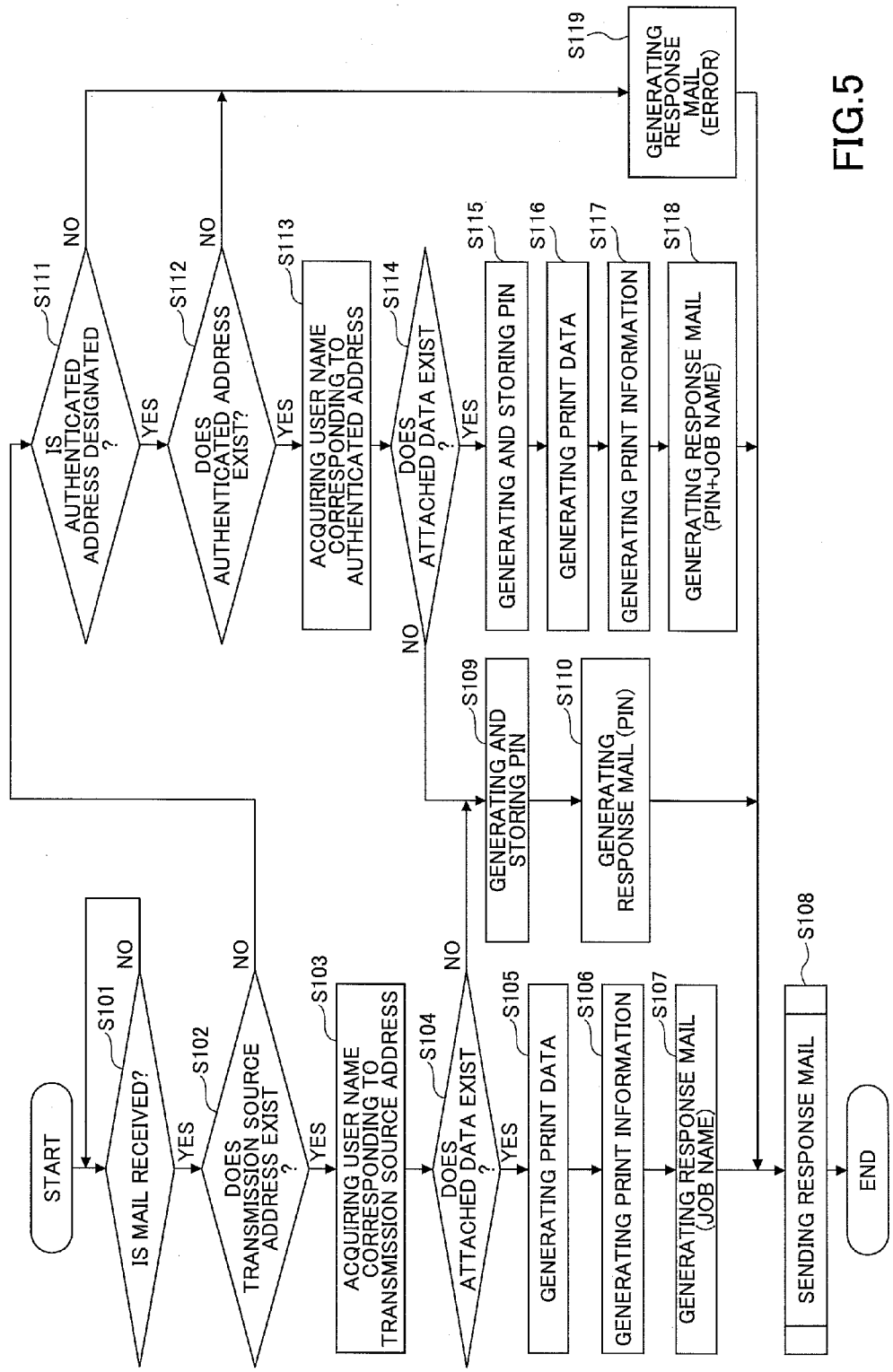
FIG. 5 is a flowchart of an exemplary procedure performed by the management server in response of a receipt of a mail.

Hereinafter, the procedure performed by the information processing system 1 is described. FIG. 5 is a flowchart of an exemplary procedure performed by the management server in response of a receipt of a mail.

The mail receiving unit 11 of the management server 10 waits for a receipt of the PIN request mail or the print request mail in step S101. For example, the mail receiving unit 11 monitors a receipt of an email to a predetermined address by polling or the like. When the corresponding email is received by the mail server 40 and the email is acquired by the mail receiving unit 11 (Yes in S101), the address confirming unit 13 sends the existence confirming request of confirming the existence of the transmission source address of the mail address to the authentication server 50 to confirm the existence of the transmission source address (S102). The request responding unit 51 of the authentication server 50 confirms whether the mail address designated in the existence confirming request of confirming the existence of the mail address is included as a mail address in the user information, which is stored in the user information memory unit 52.

FIG. 6 illustrates an exemplary structure of the user information memory unit. Referring to FIG. 6, the user information memory unit 52 stores user information for each authenticated user. The user information includes, for example, a user name, a password, a mail address (an authenticated address), or the like. Multiple authenticated addresses for a personal computer (PC), a portable terminal, or the like may be registered for one user.

The request responding unit 51 returns a response including a result of the confirmation to the management server 10. The result of the confirmation is information indicative of whether the transmission source address exists.

In a case where the result of the confirmation indicates that the transmission source address exists (Yes in S102), the address confirming unit 13 acquires the user name corresponding to the transmission source address of the email from the authentication server 50 (S103). Said differently, in the user information memory unit 52, a user name associated with the transmission source address is acquired.

Subsequently, the mail classifying unit 12 confirms whether there are attached data to the email (S104). In a case where there are the attached data, the email is highly probably a print request mail received from the authenticated user. The print information generating unit 15 generates print data of the attached data (S105). In a case where multiple attached data are included, the print information generating unit 15 generates the print data for each attached data. In a case where the attached data are an archive file including multiple files in a zip type, the print information generating unit 15 decompresses the archive file and generates print data for each decompressed file. Therefore, multiple print data (the print jobs) are generated for one print request mail. Further, the print data may be generated for the body of the print request mail.

Subsequently, the print information generating unit 15 generates the print information for each print data, and sends the generated print information to the storing server 60 (S106). When the print information receiving unit 61 of the storing server 60 receives the print information, the print information is memorized (stored) in the print information memory unit 62.

FIG. 7 illustrates an exemplary structure of the print information memory unit. Referring to FIG. 7, the print information memory unit 62 stores the print information for each print data. The print information includes a job name, a user mode, print data, and a user name or the PIN code.

The job name is identification information for each print data or for each print job performed for each print data. The user mode is information indicating whether the transmission source address of the print request mail is an authenticated address. Within the embodiment, the user mode indicates whether the user of the print request source is the authenticated user or the guest user. Hereinafter, "U" designates the authenticated user and "G" designates the guest user. The user name is of a user who has a responsibility for the print job based on the print information. The user who has the responsibility for the print job is, for example, a user who has to bear the expense for the print job (however, an entity which actually bear the expense may be a department to which the user belongs), a user recorded in association with a log when the print job is output, or a user whose account for the print job is added in an environment where the account (the accumulated number of sheets) of the number of printed sheets output for each authenticated user. The PIN code is assigned to the user of the print request source when the user is the guest user.

In step S106, print information is generated for each print data, and the job name corresponding to each print data is included in each print information. A user mode of each print information is set up with "U". Each print information is set up with the user name acquired in step S103. This print information is sent to the storing server 60.

Subsequently, the response mail generating unit 16 generates a response mail whose body has the job name of each print information described in it (S107). Subsequently, the mail returning unit 17 sends the response mail (S108).

The user who has browsed the response mail can know a job name corresponding to the print data, which are generated in response to the print request mail. However, when the transmission source address exists in the user information memory unit 52, it is not always necessary for the response mail to be returned. For example, in a case where the job name is generated based on the file name of the electronic data, the user can know the contents of the print data corresponding to each job name at a time of operating the image forming apparatus described below.

On the other hand, in a case where there is no data attached to the email in "NO" of step S104, the email is highly probably a PIN request mail received from the authenticated user. Therefore, the PIN code generating unit 14 generates a PIN code having a value different from the PIN code, which has already been issued, and causes the PIN code to be stored in the PIN code memory unit 111 in association with the transmission source address of the PIN request mail and the user name of the authenticated user acquired in step S103 (S109).

FIG. 8 illustrates an exemplary structure of a PIN code memory unit. As illustrated in FIG. 8, the PIN code memory unit 111 stores the generated PIN code in association with the mail address and the authenticated user. The mail address is a transmission source address of the email causing the PIN code to be issued. The user name is of the authenticated user related to the email. In a case where the transmission source address of the authenticated user related to the email is the authenticated address, the authenticated user relates to the authenticated address. In a case where the transmission source address of the authenticated user related to the email is not the authenticated address, the authenticated user does not relate to the authenticated address.

Within the embodiment, the newly generated PIN code may be generated by any method if the PIN code, which is newly generated, has a value different from the PIN code, which is already issued (which is stored in the PIN code memory unit 111). However, the PIN code is preferably structured by characters, which can be easily input through an operation panel 25 of the image forming apparatus 20 or a software keyboard displayed on the operation panel 25.

Subsequently, the response mail generating unit 16 generates a response mail whose body has the generated PIN code described in it (S110). The response mail is transmitted in step S108. The authenticated user who browses the response mail can know the PIN code, an input of which to the image forming apparatus 20 is necessary in a case where copying or scanning is required. As a case where the authenticated user having the operation authority receives an issuance of the PIN code, there is an example that the authenticated user having the operation authority receives the issuance of the PIN instead of a guest user who is a visitor of the authenticated user. In this case, the authenticated user reports the issued PIN code to the guest user. As described later, the guest user can log in the image forming apparatus 20 using the PIN code.

On the other hand, in step S102, the address confirming unit 13 confirms whether the authenticated address is designated in the email in S111. For example, it is confirmed whether the authenticated address is designated in the Cc address, the Bcc address, the title, or the body. How to designate the authenticated address may be appropriately determined.

In a case where the authenticated address is designated in the email (YES of S111), the address confirming unit 13 confirms whether the authenticated address exists by a method similar to step S102 (S112). In a case where the authenticated address exists (YES of S112), the address confirming unit 13 acquires the user name of the authenticated user corresponding to the authenticated address by a method similar to step S103 (S113).

Subsequently, the mail classifying unit 12 confirms whether there are attached data attached to the received email (S114). In a case where there are the attached data, the email is highly probably a print request mail received from the guest user. Therefore, the PIN code generating unit 14 generates a PIN code by a process similar to step S109, and causes the PIN code to be stored in the PIN code memory unit 111 (see FIG. 8) in association with the transmission source address of the print request mail and the user name of the authenticated user acquired in step S103 (S115).

Subsequently, in a manner similar to steps S105 and S106, the print information generating unit 15 generates the print data and the print information, a transmission of the print information sent to the storing server 60, or the like (S116, S119). However, "G" is set to the user mode of each print information generated in step S119. Further, the user name of the authenticated user acquired in step S113, the PIN code generated in step S115 are set. For example, referring to FIG. 7, the first record is an example of the print information generated in step S119.

Subsequently, the response mail generating unit 16 generates a response mail, whose body has the PIN code in addition to the job name of each print information described in it (S118). The response mail is transmitted in step S108. The guest user who browses the response mail can know the PIN code, which is require to be input into the image forming apparatus 20 at a time of printing the print data, which are generated in response to the print request mail. Further, the user can know the job name corresponding to each print data. However, the job name is not necessarily included in the response mail.

On the other hand, in a case where there is no data attached to the email in "NO" of step S114, the email is highly probably a PIN request mail received from the guest user. Therefore, in this case, the above described steps S109 and S110 are performed. Said differently, the PIN code is issued to the guest user. As described later, the guest user can log in the image forming apparatus 20 using the PIN code.

Further, in a case where the authenticated address is not designated in the print request mail received from the guest user (NO of S111) or in a case where the mail address designated as the authenticated address is not the authenticated address (NO of S112), the response mail generating unit 16 generates, for example, a response mail (hereinafter, referred to as an "error mail") including an error message (S119). In this case, the error mail is sent.

The reason why it is necessary to designate the authenticated address to the email whose transmission source address is not the authenticated address is to prevent an unfair use of the image forming apparatus 20 by the guest user or to clarify the billing destination for a usage of the image forming apparatus 20 by the guest user. For example, when the authenticated address is designated to the Cc address or the Bcc address of the email whose transmission source address is not the authenticated address, the authenticated user can instantaneously know that the print request mail or the PIN request mail is sent by the guest user. Therefore, it is possible to detect a generation of the print request mail or the PIN request mail which is not intended by the authenticated user. As a result, an unfair use by the guest user can be prevented. The authenticated address may be designated by being listed not in the Cc address or the Bcc address but in the destination address (TO) of the print request mail or the PIN request mail.

Further, in a case where it is required to designate the authenticated address in the title or the body, the management server 10 may transfer the print request mail or the PIN request mail to the authenticated address. With this, effects similar to the case where the Cc address or the Bcc address is designated are obtainable.

Because the authenticated address is designated to the email, whose transmission source address is not the authenticated address, it is possible to associate the PIN code issued based on the email with the authenticated user. Within the embodiment, the association between the PIN code and the authenticated user is held in the PIN code memory unit 111. Based on the association between the PIN code and the authenticated user, the job performed by the image forming apparatus 20, which is logged in using the PIN code, can be caused to be associated with the authenticated user. Therefore, the authenticated user, who is the billing destination related to the job caused by the guest user to be performed by the image forming apparatus, can be specified.

However, the designation of the authenticated address may be exempted from the email received from the guest user in response to the required security or the like. In this case, steps S112 and S113 may not be performed.

Figure 9:
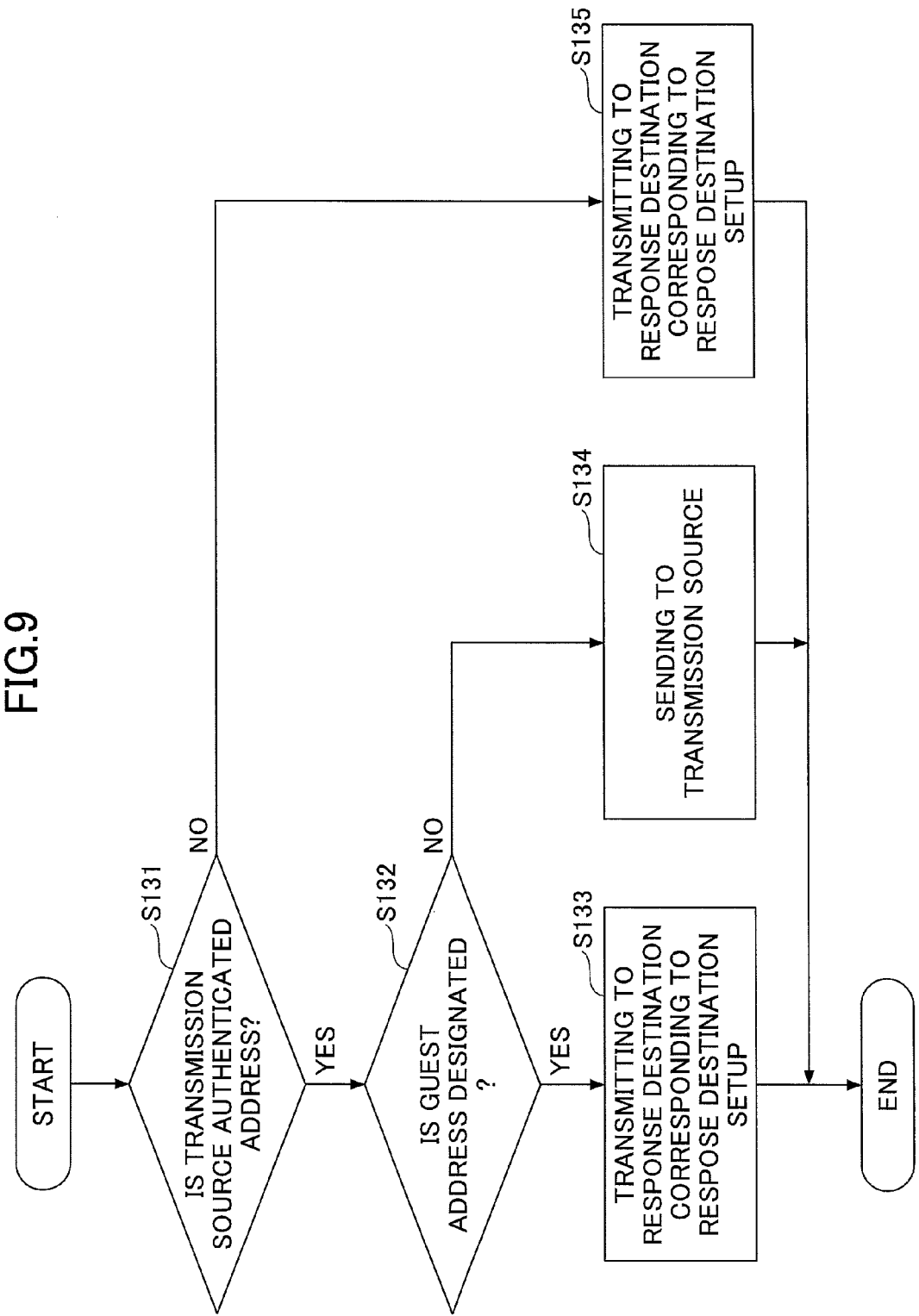
FIG. 9 is a flowchart illustrating an exemplary procedure of a transmission process of a response mail.

Subsequently, a detailed description of step S108 is described. FIG. 9 is a flowchart illustrating an exemplary procedure of a transmission process of a response mail.

In step S131, the mail returning unit 17 determines whether the transmission source address of the email received in step S101 of FIG. 5 is the authenticated address. The determination may be performed based on the result of the determination of step S102 of FIG. 5. Said differently, in YES of step S102, the transmission source address of the email is determined to be the authenticated address. Said differently, in NO of step S102, the transmission source address of the email is determined to be the guest address.

In a case where the transmission source address is the authenticated address (YES of S131), the mail returning unit 17 determines whether the guest address is designated in the email (S132). For example, it is determined whether the guest address is designated in the Cc, the Bcc, the title, or the body of the email. In a case where the guest address is designated (YES of S132), the mail returning unit 17 sends the response mail to the response destination corresponding to the setup information in the response destination setup memory unit 112 (S133).

FIG. 10 illustrates an exemplary structure of a response destination setup memory unit. Referring to FIG. 10, options of the response destination are stored in the destination setup memory unit 112 in response to whether the transmission source address is the authenticated address or the guest address.

The options designated as the response destination are, for example, "From", "Cc", "Bcc", "Subject", and "Content", or the like. "From" designates the transmission source address. "Cc" designates the Cc address, and "Bcc" designates the Bcc address. "Subject" designates the mail address designated in the title. "Content" designates the mail address designated in the body. The mail address designated in the title and the mail address designated in the body are ordinarily the guest address when the transmission source address is the authenticated address. The mail address designated in the title and the mail address designated in the body are ordinarily the authenticated address when the transmission source address is the guest address.

At least two options may be selected. For example, referring to FIG. 10, "From, Co" is set to the authenticated address. This means that the transmission source address and the Cc address are the transmission destination of the response mail.

In step S133, the response mail is sent to the destination designated as the response destination for the authenticated address.

On the other hand, in a case where the guest address is not designated (NO of S132), the mail returning unit 17 sends the response mail to the transmission source address of the email (S134).

In a case where the transmission source address of the email is the guest address (NO of S131), the mail returning unit 17 is set up as the response destination of the guest address in the response destination setup memory unit 112 and sends the response mail to the destination (S135).

As described, because the transmission destination of the response mail is not fixedly set but arbitrarily set, the response mail can be sent in a mode suitable for uses assumed in an organization using the information processing system 1.

For example, in a case where the authenticated user sends a print request mail or a PIN request mail from the authenticated address in place of a certain guest user and the guest address is designated in the email, the authenticated address, the guest address, or the authenticated address and the guest address as the transmission destination of the response mail. In a case where the response mail is returned only to the authenticated address, the print request mail or the PIN request mail may be kept secret from the guest user. Further, in a case where the response mail is sent to the guest user, the guest user can instantaneously know the PIN code allocated to the guest user even if the PIN code is not reported to the guest user from the authenticated user.

For example, in a case where the guest user sends a print request mail or a PIN request mail from the guest address and the authenticated address is designated in the email, the guest address, the authenticated address, or the authenticated address and the guest address as the transmission destination of the response mail. When the response mail including the PIN code assigned to the guest user is sent to the authenticated user, the authenticated user can know the PIN code. Therefore, for example, in a case where the image forming apparatus 20 is installed in an area restricted for the guest user, the authenticated user can cause the image forming apparatus 20 to perform a job such as printing in place of the guest user.

In the response destination setup memory unit 112, a specific mail address can be directly stored corresponding to any of the authenticated address and the guest address. For example, if the specific mail address is the mail address of an administrator, the administrator can detect that the PIN code is issued.

Subsequently, a procedure of the image forming apparatus 20 performed in response to an operation of the image forming apparatus 20 by a user is described.

Figure 11:
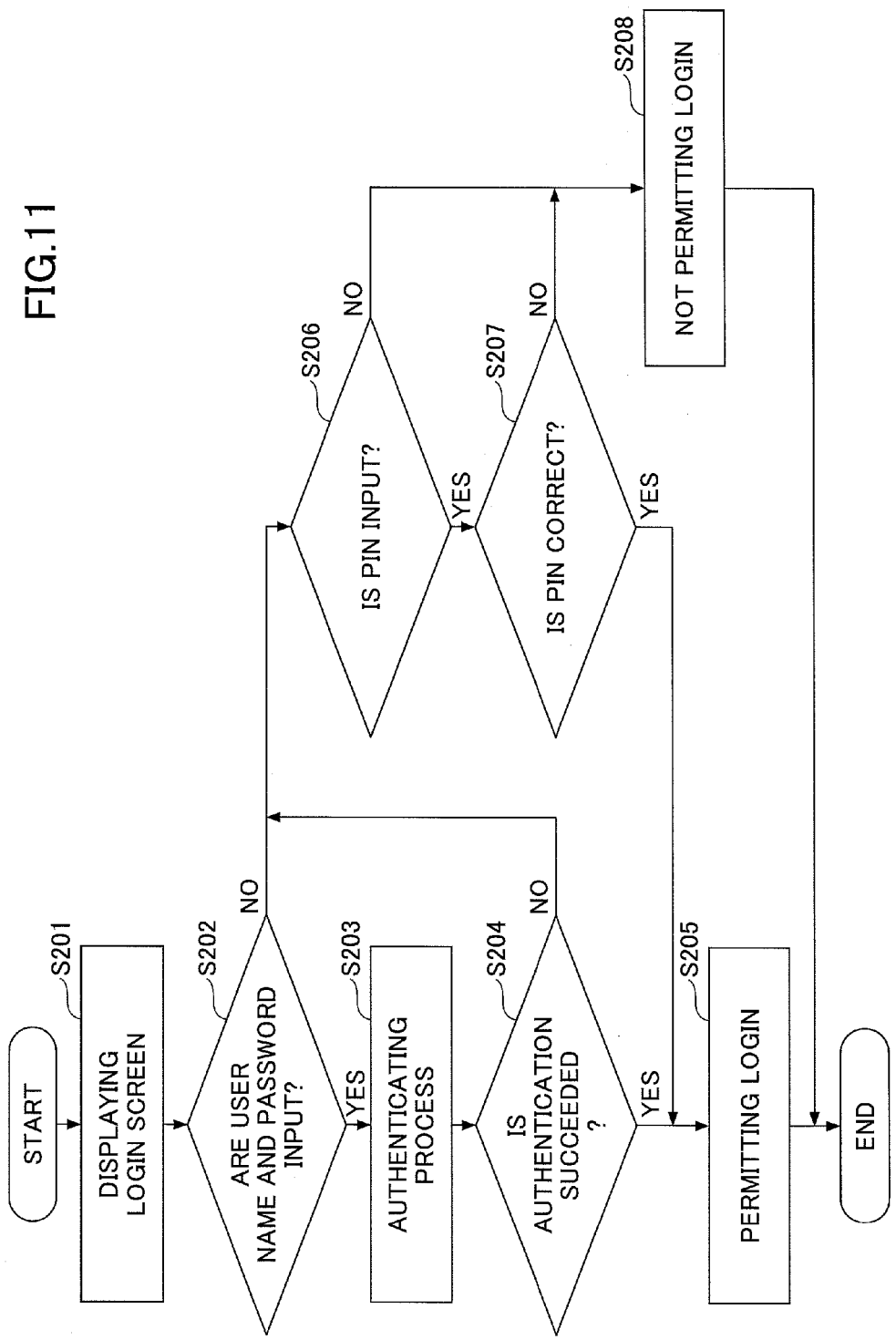
FIG. 11 is a flowchart illustrating an exemplary procedure of a login process of logging in the image forming apparatus of the embodiment of the present invention.

FIG. 11 is a flowchart illustrating an exemplary procedure of a login process of logging in the image forming apparatus of the embodiment of the present invention.

After starting the image forming apparatus 20 or after a logout of another user, the authentication controlling unit 221 causes a login screen to be displayed on the operation panel 25 (S201).

Figure 12:
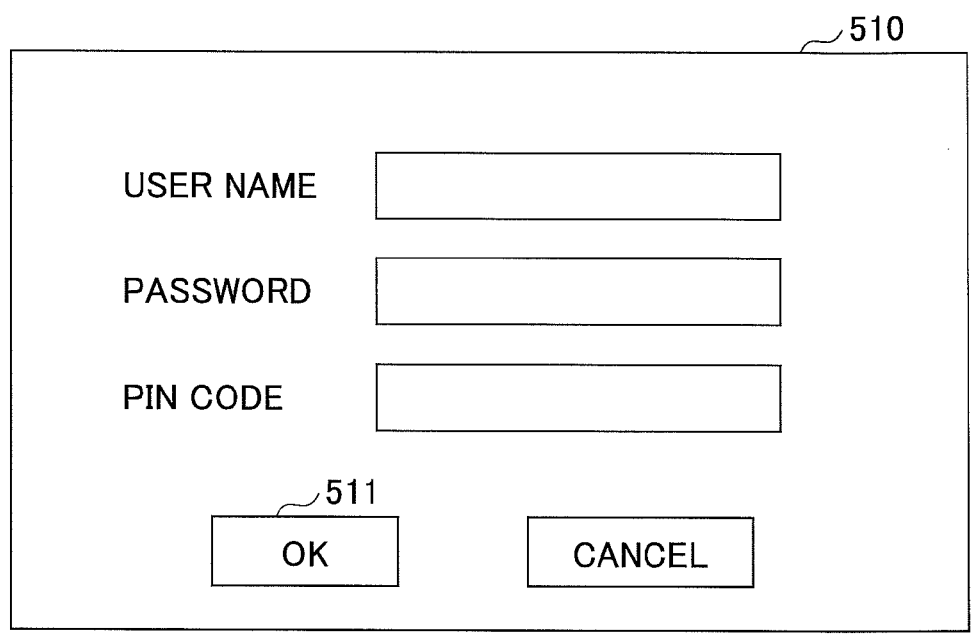
FIG. 12 illustrates an exemplary display of a login screen.

FIG. 12 illustrates an exemplary display of the login screen. Referring to FIG. 12, the login screen 510 includes an input area for the user name, the password, the PIN code, or the like.

For example, in a case where the operator of the image forming apparatus 20 is the authenticated user, the user name and the password are input in the login screen 510. On the other hand, in a case where the operator is the guest user, the PIN code reported by the response mail or the PIN code reported from the authenticated user is input in the login screen 510.

The authenticated user may input the PIN code. For example, in a case where the authenticated user sends a print request mail from a mail address of a user terminal for private use, which is other than the authenticated address, the PIN code is included in the response mail returned to the user terminal 30. On the other hand, the authenticated user may separately send the print request mail from the authenticated address. In this case, as to the authenticated user, the print data associated with the PIN code and the print data associated with the user name are stored in the storing server 60. In order to enable a print process with one login operation to be performed, the user name with the password and the PIN code may be simultaneously input.

After at least one of the user name with the password and the PIN code is input onto the login screen 510 and an OK button is pushed, the authentication controlling unit 221 determines whether the user name and the password are input onto the login screen 510 (S202). In a case where the user name and the password are input (YES of S202), the authentication controlling unit 221 performs an authentication process (S203). Specifically, the authentication controlling unit 221 sends an authentication request, in which the input user name and the password are designated, to the authentication server 50. The request responding unit 51 of the authentication server 50 determines whether the set of the user name and the password designated in the authentication request is stored in the user information memory unit 52. In a case where the set is stored in the user information memory unit 52, authentication is successful. In a case where the set is not stored in the user information memory unit 52, the authentication is failed. The request responding unit 51 sends information indicative of success or failure of the authentication to the authentication controlling unit 221 of the image forming apparatus 20 as the source of the authentication request.

In a case where the authentication is successful (YES of S204), the authentication controlling unit 221 permits the login by the operator and stores the input user name in the RAM 212 as the login information (S205). In addition to the user name and the password related to the successful authentication, the PIN code (if it is input) is included in the login information and stored in the RAM 212. In this case, the operator can cause scanning, copying, facsimile transmission, a print job performed based on the print information stored in the storing server 60, or the like to be performed by the image forming apparatus 20 within a range of authority corresponding to the input user name.

On the other hand, in a case where the user name and the password are not input onto the login screen 510 (NO of S202) or a case where the authentication based on the user name and the password is failed (NO of S204), the authentication controlling unit 221 determines whether the PIN code is input onto the login screen 510 (S206). In a case where the PIN code is input (YES of S206), the authentication controlling unit 221 confirms the rightfulness of the PIN code (S207). Specifically, if the PIN code is stored in the PIN code memory unit 111, the PIN code is determined to be correct. Specifically, if the PIN code is not stored in the PIN code memory unit 111, the PIN code is determined to be incorrect. Meanwhile, in a case where the rightful PIN code is stored in the PIN code memory unit 111, the mail address and the authenticated user name, which are stored in association with the PIN code, are acquired from the PIN code memory unit 111.

In a case where the input PIN code is correct (YES of S207), the authentication controlling unit 221 permits a login by the operator and stores the PIN code, and the mail address and the authenticated user name corresponding to the PIN code in the RAM 212 as the login information. In this case, the operator can cause scanning, copying, facsimile transmission, a print job performed based on the print information stored in the storing server 60, or the like to be performed by the image forming apparatus 20 within a range of authority corresponding to the input user name.

On the other hand, in a case where the input PIN code is incorrect (NO of S207), the authentication controlling unit 221 does not permit the login by the operator (S208). In this case, for example, the login screen is maintained to be displayed, and the operator cannot use the image forming apparatus 20.

Further, in a case where the image forming apparatus 20 performs a job in response to the operation by the operator who has successfully logged in, the image forming apparatus 20 may include the login information into log data and record the login information. With this, it is possible to specify the authenticated user who has a responsibility for each job. Further, in a case where the operator is a guest user, the mail address of the guest user is stored in the log data. Then, it is possible to expect a psychological deterrent effect and an improvement in tracking the guest user who has performed the unfair use. However, the mail address of the guest user may not always be included in the log data. In this case, the mail address may not be stored in the PIN code memory unit 111.

Subsequently, when an execution instruction of the print job is input based on the print information stored in the storing server 60 by the operator whose login is permitted, a procedure performed by the image forming apparatus 20 is described.

Figure 13:
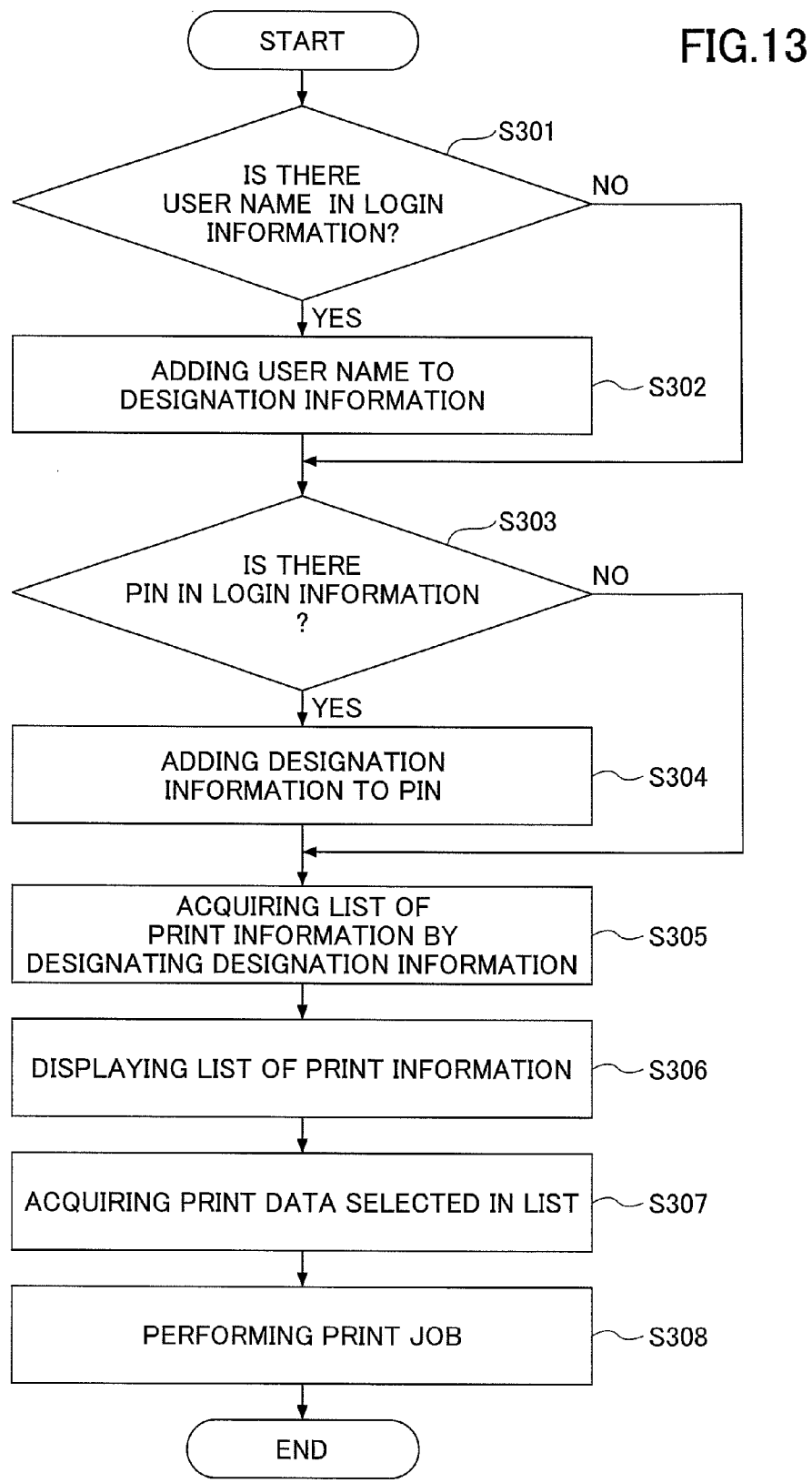
FIG. 13 is a flowchart illustrating an exemplary procedure of an execution process of a print job based on print information stored in a storing server.

FIG. 13 is a flowchart illustrating an exemplary procedure of an execution process of the print job based on print information stored in the storing server.

In step S301, the print information acquiring unit 222 determines whether a user name is included in the login information. In a case where the user name is included in the login information (YES of S301), the print information acquiring unit 222 adds the user name to the designation information (S302). The designation information is designated at a time of acquiring a list of the print information from the storing server in the later step S305.

In step S301, the print information acquiring unit 222 determines whether the PIN code is included in the login information (S303). In a case where the PIN code is included in the login information (YES of S303), the print information acquiring unit 222 adds the PIN code to the designation information (S304).

Subsequently, the print information acquiring unit 222 designates designation information and acquires a list of the print information from the storing server 60 (S305). Specifically, the print information acquiring unit 222 designates the designation information, and sends an acquisition request of acquiring the list of the print information to the storing server 60. In response to the acquisition request, the print information providing unit 63 of the storing server 60 acquires the print information including the designation information designated in the acquisition request from the print information memory unit 62 (FIG. 7). Said differently, in a case where the user name is included in the login information, a user mode is "U" and the print information including the user name is acquired. Said differently, in a case where the PIN code is included in the login information, the user mode is "G" and the print information including the PIN code is acquired.

In a case where the user name and the PIN code are included in the login information, the print information including a user mode of "U" and the user name, and the print information including a user mode of "G" and the PIN are acquired.

The print information providing unit 63 returns the acquired list of the print information to the image forming apparatus 20. The print data may not be included in each print information to be returned.

Subsequently, the print information acquiring unit 222 of the image forming apparatus 20 causes the list of the job names included in each returned print information into the operation panel (S306). This list is a candidate to be printed. Said differently, the user can input an instruction of executing the print for the print information included in the list.

When at least one job name is selected from the list, the print information acquiring unit 222 acquires the print data corresponding to the job name from the storing server 60 (S307). Specifically, the print information acquiring unit 222 sends an acquisition request of acquiring the print data, in which the job name is designated, to the storing server 60. The print information providing unit 63 of the storing server 60 returns the print data corresponding to the job name designated by the acquisition request to the image forming apparatus in response to the acquisition request.

If the print information corresponding to one print data is acquired by the user name or the PIN code included in the login information, the process of S306 may not be performed, and the print information acquiring unit may automatically acquire print data. Further, instead of returning, by the print information providing unit 63, the list of the print information to the image forming apparatus 20, the print data acquired by the user name and the PIN code may be returned.

Subsequently, the print controlling unit 223 controls an execution of the print job related to the print data (S308). As a result, a paper on which the print data are printed is output.

As described, within the embodiment, it is possible to give a PIN code, which is a temporal and pseudo account, to the guest user who does not have the account. Further, the PIN code differs between the guest users. Therefore, it is possible to improve security between the guest users in comparison with an account used in common by the guest users. Within the embodiment, an example that the print request or the issuance request of the PIN code are sent in a format of the email and the PIN code is responded in a format of the email is described. However, a communication unit for the print request, the issuance request of the PIN code, and the response of the PIN code is not limited to the email. For example, these request and response may be performed using a communication unit such as a Web interface or another communication unit. For example, in the case of the Web interface, the transmission source address may be replaced by an IP address of the transmission source of the request. For example, the user information memory unit 52 may store the IP address of the user terminal 30 used by the authenticated user in place of the mail address or together with the mail address. Further, the PIN code memory unit 111 may store the IP address of the transmission source of the request in place of the mail address.

Further, within the above embodiments, although the PIN code is explained as the one example of the identification information for identifying the operation authority, the PIN code may be used as identification information for identifying operation authorities of another apparatus such as a projector or a teleconference system.

Furthermore, within the above embodiments, the PIN code is an example of the authority identifying information. The mail receiving unit 11 is an example of the receiving unit. The PIN code generating unit 14 is an example of a generating unit. The mail returning unit 17 is an example of a sending unit.

A user previously having no operation authority can use the apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing system has been described in detail, it should be understood that various changes, substitutions, and alterations could be made thereto without departing from the spirit and scope of the invention.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any recording medium for storing processor readable code such as a floppy disk, hard disk, CD ROM, magnetic tape device or solid state memory device.)

The hardware platform includes any desired hardware resources including, for example, a central processing unit (CPU), a random access memory (RAM), and a hard disk drive (HDD). The CPU may include processors of any desired kinds and numbers. The RAM may include any desired volatile or nonvolatile memories. The HDD may include any desired nonvolatile memories capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

This application is based upon and claims the benefit of priority of the prior Japanese Patent Application No. 2013-151539, filed on Jul. 22, 2013, the entire contents of which are incorporated herein by reference.

What is claimed is:

1. An information processing system including at least one computer, the information processing system comprising:
a receiving unit configured to receive a mail designating a predetermined destination, the mail being provided to request to get authority identifying information which identifies operation authority of operating an apparatus; and
a sending unit configured to send the authority identifying information to a destination designated in a predetermined part of the mail which is different from a transmission source designating part of the mail.

2. The information processing system according to claim 1, wherein the predetermined part is at least one of sending destination, title, and body of the mail, the sending destination being at least one of Cc address and Bcc address.

3. The information processing system according to claim 1, further comprising:
a user information storing unit configured to store user information including user identification information of a user;
a confirming unit configured to confirm whether the user identification information to be associated with the authority identifying information is specified from among the user information or not in response to a receipt of the mail;
a generating unit configured to generate the authority identifying information in response to the receipt of the mail; and
an authority identifying information management unit configured to manage the generated authority identifying information associated with the specified user identification information;
wherein the sending unit is configured to send the generated authority identifying information when the user identification information is specified by the confirming unit.

4. The information processing system according to claim 3, wherein the user information storing unit is configured to store the user information including a mail address associated with the user identification information,
wherein the confirming unit is configured to confirm whether the mail address included in the received mail exists in the mail address stored in the user information storing unit or not, and specifies the user identification information associated with the mail address of which existence is confirmed.

5. An information processing apparatus comprising:
a receiving unit configured to receive a mail designating a predetermined destination, the mail being provided to request to get authority identifying information which identifies operation authority of operating an apparatus; and
a sending unit configured to send the authority identifying information to a destination designated in a predetermined part of the mail which is different from a transmission source designating part of the mail.

6. The information processing apparatus according to claim 5,
wherein the predetermined part is at least one of sending destination, title, and body of the mail, the sending destination being at least one of Cc address and Bcc address.

7. The information processing apparatus according to claim 5, further comprising:
a user information storing unit configured to store user information including user identification information of a user;
a confirming unit configured to confirm whether the user identification information to be associated with the authority identifying information is specified from among the user information or not in response to a receipt of the mail;
a generating unit configured to generate the authority identifying information in response to the receipt of the mail; and
an authority identifying information management unit configured to manage the generated authority identifying information associated with the specified user identification information;
wherein the sending unit is configured to send the generated authority identifying information when the user identification information is specified by the confirming unit.

8. The information processing apparatus according to claim 7,
wherein the user information storing unit is configured to store the user information including a mail address associated with the user identification information,
wherein the confirming unit is configured to confirm whether the mail address included in the received mail exists in the mail address stored in the user information storing unit or not, and specifies the user identification information associated with the mail address of which existence is confirmed.

9. An authority providing method performed by an information processing system including at least one computer, the authority providing method comprising:
receiving a mail designating a predetermined destination, the mail being provided to request to get authority identifying information which identifies operation authority of operating an apparatus; and
sending the authority identifying information to a destination designated in a predetermined part of the mail which is different from a transmission source designating part of the mail.

10. The authority providing method according to claim 9, wherein the predetermined part is at least one of sending destination, title, and body of the mail, the sending destination being at least one of Cc address and Bcc address.

11. The authority providing method according to claim 9, further comprising:
storing user information including user identification information of a user;

confirming whether the user identification information to be associated with the authority identifying information is specified from among the user information or not in response to a receipt of the mail;

generating the authority identifying information in response to the receipt of the mail; and managing the generated authority identifying information associated with the specified user identification information;

wherein the sending sends the generated authority identifying information when the user identification information is specified by the confirming.

12. The authority providing method according to claim 11, wherein the storing stores the user information including a mail address associated with the user identification information, wherein the confirming confirms whether the mail address included in the received mail exists in the mail address stored by the storing or not, and specifies the user identification information associated with the mail address of which existence is confirmed.

\* \* \* \* \*